United States Patent
McCollum (10) Patent No.: US 8,184,982 B2
(45) Date of Patent: May 22, 2012

(54) DATA REPORTING SYSTEMS AND METHODS

(75) Inventor: Peter Lloyd McCollum, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 12/340,700

(22) Filed: Dec. 20, 2008

(65) Prior Publication Data

US 2010/0161840 A1    Jun. 24, 2010

(51) Int. Cl.
*H04B 10/00*    (2006.01)

(52) U.S. Cl. .......................... 398/127; 398/172

(58) Field of Classification Search .................. 398/127, 398/118, 172
See application file for complete search history.

(56) References Cited

U.S. PATENT DOCUMENTS

| | | | | |
|---|---|---|---|---|
| 5,345,327 | A | * | 9/1994 | Savicki .......................... 398/212 |
| 5,724,168 | A | * | 3/1998 | Oschmann et al. ........... 398/127 |
| 2005/0025503 | A1 | * | 2/2005 | Astrauskas .................... 398/202 |
| 2010/0054734 | A1 | * | 3/2010 | Hosking ......................... 398/25 |

OTHER PUBLICATIONS

Intel® I/O Controller Hub 8 (ICH8) Family, May 2007: See, e.g., sections 5.28, 5.28.1, and 5.28.2 on pp. 252-253.
Paul Dietz, William Yerazunis, Darren Leigh, "Very Low-Cost Sensing and Communication Using Bidirectional LEDs," Jul. 2003.

* cited by examiner

*Primary Examiner* — Nathan Curs (57) ABSTRACT

Systems and methods for data reporting in electronics devices are disclosed. An exemplary system may include a processor configured to encode a bit stream representing information from at least one subsystem in the electronics device. The system may also include an output device in the electronics device. The output device outputs the bit stream for decoding with a receiving device while being ordinarily visually imperceptible to an end-user without the receiving device.

19 Claims, 4 Drawing Sheets

DATA REPORTING SYSTEMS AND METHODS

BACKGROUND

Consumer electronics (CE) products and other electronic devices are widely commercially available to both everyday consumers and large-scale purchasers, and include but are certainly not limited to, computer systems, peripherals devices, and appliances. These electronic devices may include a variety of subsystems, such as processors, storage devices, cooling devices, batteries, interconnects, and power supplies, to name only a few examples. The status or "health" of these sub-systems is often monitored by fairly sophisticated processors executing program code.

During development, testing, and maintenance of electronic devices, a technician or other user may need to determine the status of one or more subsystem, e.g., in order to diagnose a problem and make a repair. Accordingly, the technician must access the processor monitoring the subsystem(s) to retrieve the status and/or diagnostic information. A dedicated diagnostic interface, such as a liquid crystal display (LCD), may be provided to make accessing the processor more convenient. However, this seldom makes sense for reasons such as cost, physical space, aesthetics, and lack of intended use by the end-use.

Instead, electronic devices may be provided with an interface connector that the technician may connect to with a "code-reader" in order to read out the status and/or diagnostic information. But the interface connector is also undesirable by adding to the cost of the electronic devices. In addition, the electronic devices must be designed such that the interface connector is readily accessible, but for aesthetic reasons, hidden from everyday view.

Another solution is to provide a data bus between the processor monitoring the status of the subsystems and a central processor for the system where an interface may be already available. However, this solution only works for electronic devices that include a central processor with an existing interface, and that the data path exists or can be readily provided (again adding to the overall cost of the electronic devices).

In any event, accessing the processor to retrieve status and/or diagnostic information of one or more subsystem of the electronic devices may interfere with the end-user experience of the electronic devices, and degrade overall customer satisfaction.

BRIEF DESCRIPTION OF THE DRAWINGS

Various embodiments of the invention will now be described, by way of example only, with reference to the accompanying drawings, in which.

DETAILED DESCRIPTION

Briefly, systems and methods described herein may be implemented for data reporting in CE products (e.g., mobile phones, laptop computers, etc.) and other electronic devices. Exemplary systems and methods may include circuitry for retrieving status information from at least one subsystem of the electronic devices, and communicating the status information via at least one existing output device. It is noted that an "existing" output device is a device that is already provided for the electronic device which is necessitated (or desired) to provide other functions in the electronic device. For example, many electronic devices include at least one light-emitting diode (LED) indicator. Although the LED indicators are typically used only convey a few simple states to a user (e.g., green—proper function; yellow—needs attention; red—failure), the systems and methods described herein implement a communications protocol which enables the LED to transmit a serial data stream including status and/or diagnostic information to a receiving device. The receiving device may be a handheld device for use by the technician. Status and/or diagnostic information may be output on a continuous (or semi-continuous) basis so that communications are unidirectional. That is, the technician does not need to initiate communication by the electronic devices (e.g., by sending information to) in order to receive the status and/or diagnostic information.

In exemplary embodiments, the output device may output the status and/or diagnostic information to the receiving device in such a manner that the data stream cannot be visibly perceived by an end-user. For example, where the output device is an LED indicator, the LED indicator may be driven at a high rate in a short burst. In addition, there is no electrical or mechanical impact on the hardware design of the CE product because the output device is already provided on the CE product. Existing CE products may be modified, e.g., using a simple firmware upgrade. The status and/or diagnostic information can be read using the technician's receiving device.

The systems and methods describe a non-invasive diagnostic tool that enables detailed information to be retrieved from an electronics device without the requirement to design-in a diagnostic or maintenance interface. No hardware changes are needed for a typical device that already includes a microprocessor and a user-visible LED indicator. The user of the receiver device does not need to disturb the operation of the system in any way, does not need to connect any cables, and does not need access to a customer's computing infrastructure.

Exemplary System

Figure 1:
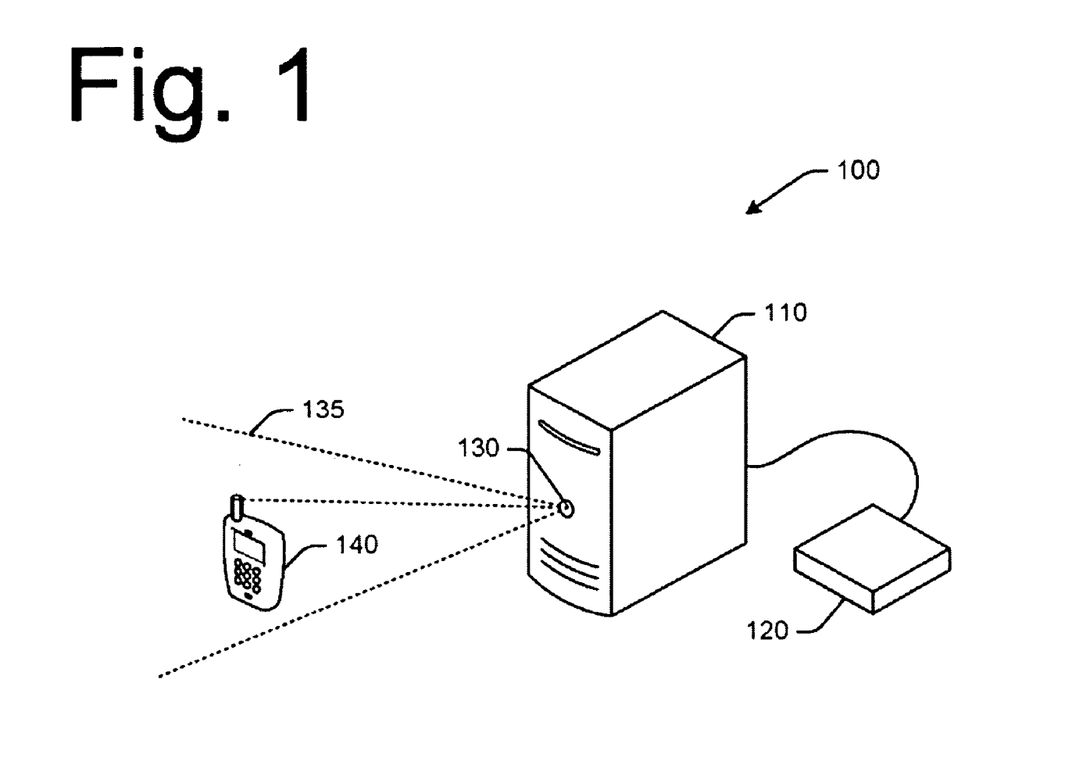
FIG. 1 is an illustration of an exemplary data reporting system.

FIG. 1 is an illustration of an exemplary data reporting system 100. The data reporting system 100 may include an electronics device 110. Electronics device 110 may be any of a wide variety of commercially available electronics devices, such as a computer system (e.g., a rack-mounted server system), or Consumer Electronics (CE) product. The electronics device 110 may include one or more subsystem 120. Although an externally connected subsystem 120 is shown in FIG. 1, the electronics device 110 may include internal and/or external subsystems.

The electronics device 110 may also include at least one output device 130. The output device 130 may be an already existing component on the electronics device 110. For example, the output device 130 may be an existing light-emitting diode (LED) indicator that is used to indicate various operational states of the electronics device 110 to the end-user (e.g., a power indicator). Such an embodiment simplifies the electronics that need to be included by the manufacturer of the electronics device and reduces or eliminates the need to include separate hardware. In an exemplary embodiment, the LED may be a non-visible LED indicator, as discussed in more detail below. However, the systems and methods described herein are not limited to any particular type of output device 130.

The output device 130 may be configured to output a signal 135. The signal 135 may be a bit stream encoding status and/or diagnostic information of the electronics device 110 and/or one or more subsystem 120 of the electronics device 110. The bit stream may be output using a suitable communications protocol such that the signal 135 can be received be a receiving device 140 and decoded at the receiving device 140 for the status and/or diagnostic information.

In an exemplary embodiment, the signal 135 is output so that the signal 135 is imperceptible to the end-user (or for that matter, any human being) without the receiving device 140. This may be accomplished in any of several ways, which will be discussed in more detail below. For now, however, it is sufficient to understand that output device 130 (e.g., an LED indicator) may be driven at a high rate in short bursts so that a bit stream may be decoded by the receiving device 140, but the blinking LED is visually imperceptible to the end-user. Such an embodiment enhances the end-user experience and overall satisfaction with the electronics device 110. That is, the end-user does not have to see a flickering or blinking LED indicator on the electronics device 110.

The signal 135 may be output continuously (or semi-continuously) so that the signal 135 can be received at the receiving device 140 by moving the receiving device 140 within range of the signal 135 without having to separately activate the output device 130. In an exemplary embodiment, semi-continuously means about every 5 to 10 seconds, although this definition is not limiting. Accordingly, the system 100 may enable unidirectional communication, simplifying the electronics that need to be included by the manufacturer of the electronics device.

It is noted that any suitable timing may be implemented for outputting the signal 135. Selecting a suitable timing may depend on various design considerations. Exemplary design considerations may include system demand on the electronics device 110, as well as other operating parameters.

In another exemplary embodiment, a non-visible (e.g., an infrared (IR), ultra-violet (UV), radio frequency (RF), microwave, ultrasound, etc.) LED indicator may be implemented instead of a user-visible LED. Although this may require a minor change to the hardware design of the electronics device (i.e., to include the non-visible LED at any convenient location), because the light from the non-visible LED is not visible the software can continuously transmit data packets, and the speed and duty cycle of the bit rate is no longer a concern. Accordingly, this embodiment allows for arbitrarily-long data packets transmitted at a very high rate without any visible "flicker," while the cost of the hardware change is minimal. In addition, the receiving device 140 does not need to have close physical access to the non-visible LED, and therefore the receiving device 140 may be fitted with a length of optical-fiber (or light pipe) that allows the technician to access the optical signal by inserting the fiber through any convenient opening in the packaging of the electronics device 110 (e.g., a ventilation hole).

Before continuing, it is noted that the data reporting system 100 may be activated at start-up of the electronics device 110 in order that the status and/or diagnostic information be based on operational data for the various subsystems 120. Also in exemplary embodiments, the status and/or diagnostic information may be continually updated during operation, e.g., based on changes in the run-time environment.

Figure 2:
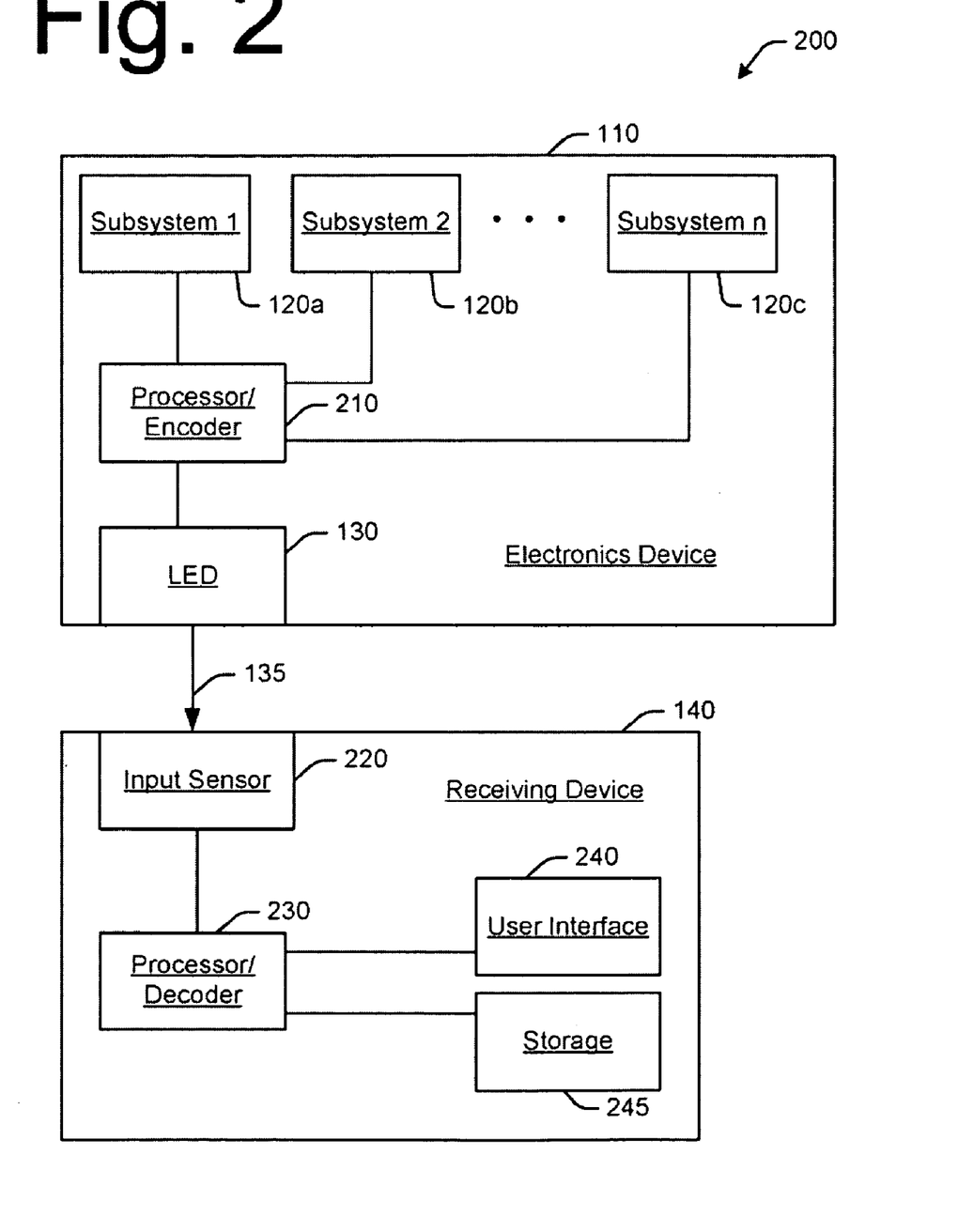
FIG. 2 is a high-level block diagram illustrating functional components of an exemplary data reporting system.

FIG. 2 is a high-level block diagram 200 illustrating functional components of an exemplary data reporting system (e.g., the system 100 shown in FIG. 1). As noted above, the data reporting system may include an electronics device 110 including one or more subsystems 120 (subsystems 120a-c are shown in FIG. 2). Again, the subsystems may be internal and/or external to the electronics device 110.

The electronics device may also include a processor 210 operatively associated with the subsystems 120 to receive status and/or diagnostics information. The processor 120 may also be configured as an encoder to encode the status and/or diagnostics information as a bit stream for output as a signal 135 by the output device 130 (e.g., an LED indicator).

Before continuing, it is again noted that minimal changes, and in some embodiments no changes, are necessary to the hardware of the electronics device 110. The data reporting systems may utilize the existing hardware (e.g., processor 210 and output device 130). The program code (e.g., firmware) executing on the processor 210 may be modified to include the encoding capabilities.

In exemplary embodiments, program code (e.g., firmware) executing on the processor 210 at the electronics device 110 periodically outputs a brief data stream via the LED 130, by toggling the LED 130 on and off at a high rate in a short 'burst'. The occasional 'flicker' of the LED is not readily apparent to an observer, but a suitable device can receive the optical data and display or record it.

The signal may be received by an input sensor 220 at the receiving device 140. In an exemplary embodiment, the input sensor 220 is an optical sensor capable of receiving light signals 135 from an LED 130. The input sensor is connected to a processor 230 at the receiving device. The processor 230 is configured as a decoder to decode the signal 135 received by the input sensor 220.

The processor 230 may be operatively associated with a user interface 240, a storage device 245 (e.g., an SD flash card), or other connection (e.g., a port for linking to an external device). Accordingly, the processor 230 may output the decoded status and/or diagnostics information for a technician (or other user) of the receiving device 140.

The output device 130 may communicate with the receiving device 140 according to any of a wide variety of different transmission or communications protocols. In general, the protocol should be relatively simple so as not to impose any additional burden on the electronics device 110. In addition, the protocol should minimize the 'flicker' of the LED.

In an exemplary embodiment, a transmission signal 135 includes at least one sync bit, followed by a plurality of data bits, followed by at least one checksum bit. The bits are not required to be sent at any specific rate, because doing so would place a 'timing requirement' on the electronics device 110. Instead, the receiving device is responsible for determining the actual bit rate during each transmission, e.g., by examining the sync bit(s). However, the output device 130 must transmit the entire packet for a given transmission packet at a fixed rate. Then if the output device 130 interrupts the transmission of a packet to perform higher priority work (thus disturbing the bit-transmission protocol), then the packet should be discarded by the receiving device.

The following protocols are described for purposes of illustration and are not intended to be limiting. In a first exemplary embodiment, the output device 130 sends a data packet every 5 seconds. A packet includes a number of bits (or bytes), beginning with a sync bit (or byte). The sync bit (or byte) establishes a time interval that will be used in the remainder of the packet. The processor 230 at the receiving device 140 uses the sync bit (or byte) to determine the data rate being used by the output device 130. This information allows the remainder of the data packet to be decoded. The sync byte may be 0xFE, so that the first bit (lsb) is '0' and the remaining bits are '1'. The receiving device 140 measures the interval between the second and third bits, and determines that all subsequent bits will follow the same timing.

For purposes of this example, a '1' bit is defined as a low-to-high transition that occurs at a predetermined bit interval. Also for purposes of this example, a '0' bit is defined as the absence of a low-to-high transition at the predetermined bit interval. The occurrence of a '1' bit serves to reset the time reference for the position of the next bit. Accordingly, the transmitted data may avoid long sequences of '0' bits, because there is no embedded time reference.

The bytes that make up a complete packet are sent continuously, so as to maintain the per-bit timing that was established by the sync byte. The first byte after the sync byte indicates the length of the packet. The last byte in the packet is a checksum. All other bytes are determined by the processor 210 for the output device 130.

Another exemplary protocol may also be implemented to reduce or eliminate human-visible flicker of the LED. Instead of sending all bits of a packet contiguously, instead each byte may be sent asynchronously. The transmission may include two sync bits at the beginning of each byte. This embodiment reduces visible flicker of the LED by returning the LED to a normal state for a predetermined minimum time between transmitting bytes, thus reducing the perceived change in the LED's brightness. An advantage of including sync bits before each byte is that it does not matter how much time passes between bytes. So if the sender is 'busy' and unable to send a byte for awhile, this delay does not break the protocol. By choosing the minimum time between bytes appropriately, the perceived 'flicker' can be reduced to zero.

Another exemplary protocol to reduce or eliminate any human-visible flicker of the LED is to change the 'duty cycle' of the individual transmitted bits. In an exemplary embodiment, the duty cycle is determined based on the LED's state (i.e., "on" or "off"). That is, if the LED is 'on' before the transmission begins, then a high duty cycle is implemented to keep the LED 'mostly on'. But if the LED is 'off' before the transmission begins, then a low duty cycle is implemented to keep the LED 'mostly off'. Adjusting the duty cycle works because the receiving device 140 is only sensitive to low-to-high transitions, but is unaffected by how long the LED stays on for each bit.

Figure 3:
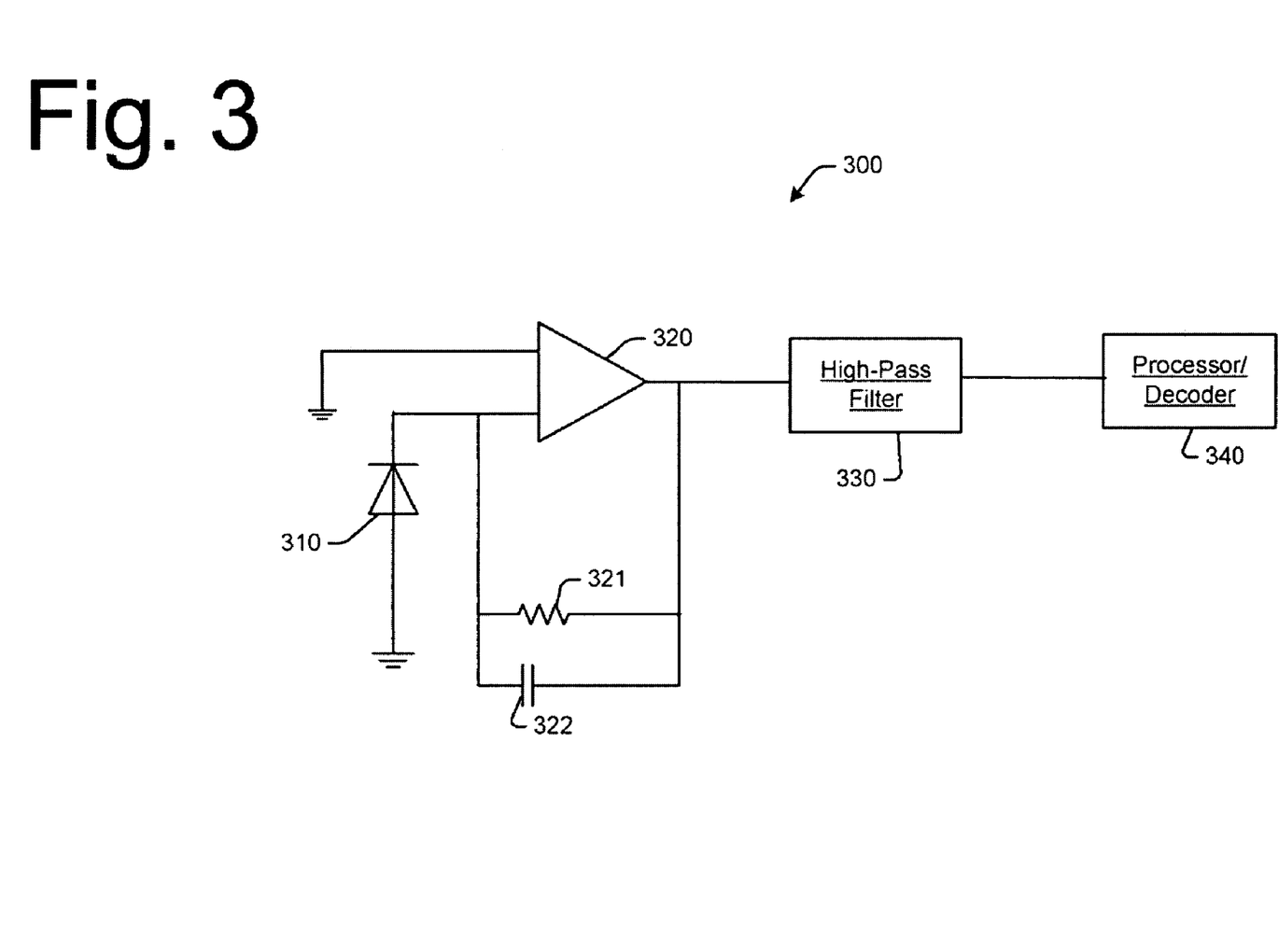
FIG. 3 is a circuit diagram of a receiving device for an exemplary data reporting system.

FIG. 3 is a circuit diagram of a receiving device for an exemplary data reporting system. The circuit 300 may be implemented entirely at the receiving device so that minimal, if any, hardware changes need to be made to the electronics device. In exemplary embodiments, only program code (e.g., firmware) needs to be included with the electronics device. This is particularly desirable in low-cost CE products, where any incremental cost increase may be prohibitive.

The circuit 300 may include an optical sensor 310 configured to receive a signal from the output device in the electronics device. In an exemplary embodiment, optical sensor 310 is photo-sensitive diode (e.g., sensitive to light in the visible wave spectrum) so that the optical sensor 310 can detect output from an LED indicator in the electronics device.

The optical sensor 310 may be connected to a pre-amplifier configured to amplify the input signal received by the optical sensor 310. In an exemplary embodiment, the pre-amplifier includes transimpedance amp 320, resistor 321, and capacitor 322. The pre-amplifier produces a digital-compatible signal that drives an interrupt input on processor 340.

The pre-amplifier may include a high-pass filter configured to remove noise from the signal. For example, noise may include light effects, such as room lighting and other low-frequency noise, picked up during transmission of the signal between the output device and the receiving device. In an exemplary embodiment, the high-pass filter 330 includes an operational amp (op amp), capacitors, and resistors, as is conventionally known in the electronics arts.

The high-pass filter may be connected to the processor 340 configured to decode the signal for the status and/or diagnostics information. Processor 340 may be any of a wide variety of commercially available processing components (e.g., a microprocessor executing firmware), such as a microcontroller it is noted that processors are well-understood in the electronics arts.

It is noted that the exemplary circuit 300 is shown in FIG. 3 as it may be implemented in hard-wired circuitry with a processor executing program code (e.g., firmware). However, it is noted that the circuit may also be implemented in other circuitry (e.g., including logic gates). The circuit may also be implemented for either analog or digital signal processing. These and other variations will be readily apparent to those having ordinary skill in the art after becoming familiar with the teachings shown and described herein.

It is also noted that the systems and methods described herein do not need to be implemented in any particular circuit design. The circuit design described herein with reference to the figures is provided merely as exemplary of one embodiment of a circuit that may be used. It is contemplated that those having ordinary skill in the art, after becoming familiar with the teachings herein, will be able to provide other circuit designs for data reporting in electronics devices.

Exemplary Operations

Figure 4:
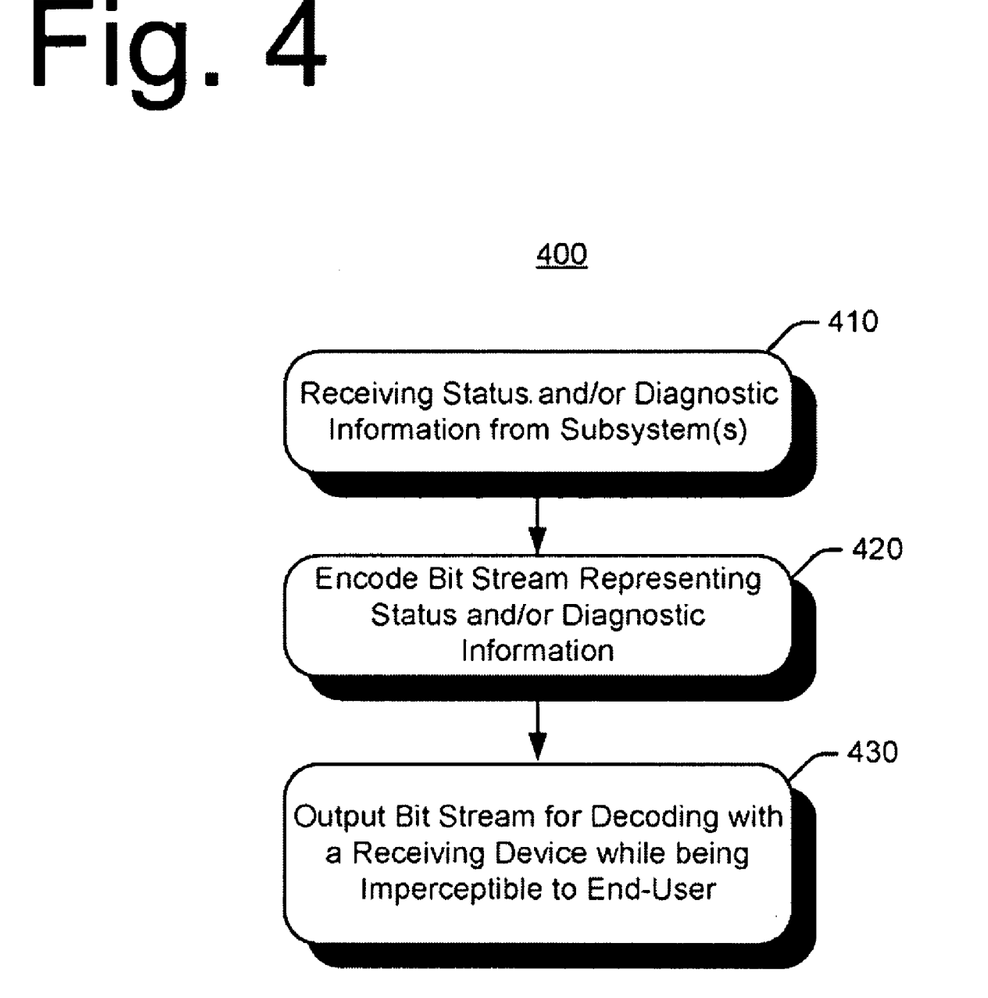
FIG. 4 is a flowchart illustrating exemplary operations for data reporting.

FIG. 4 is a flowchart illustrating exemplary operations 400 for data reporting. In an exemplary embodiment, the components and connections depicted in the figures may be used. It is also contemplated that in other embodiments, operations shown and described herein may be implemented in other circuitry, logic components, and/or control logic such as a processor or processing units.

In operation 410, status and/or diagnostic information from one or more subsystem in the electronics device may be received. For example, a processor at the electronics device may receive the status and/or diagnostic information. The processor may receive the status and/or diagnostic information in response to a query, at a predetermined time (or time interval), or if there is a problem to report.

In operation 420, a bit stream is encoded representing the status and/or diagnostic information. In operation 430, the bit stream is output by an output device (e.g., an LED indicator) in the electronics device. The bit stream is capable of being decoded with the receiving device, but outputting the bit stream is imperceptible to an end-user without the receiving device.

The operations shown and described herein are provided to illustrate exemplary implementations. It is noted that the operations described above with reference to FIG. 4 may be implemented on an ongoing basis. Still other operations may also be implemented.

The following describe examples of using the data reporting systems and methods. These examples are provided merely for purposes of illustration and are not intended to be limiting in any way.

In a first example, during development of a rack system component that dissipates significant heat, a determination is needed to adjust the firmware to set appropriate fan speeds for cooling. But realistic measurements require that the system be running a load in a data center environment. The data reporting systems and methods may be implemented to acquire data about individual fan speeds and temperature measurements inside the system, without disturbing any functionality required by the testing team.

In a second example, manufacturers may need to perform several tests on a battery pack. Getting complete visibility to the battery pack's internal parameters requires that a special firmware image be running on the controller. The data reporting systems and methods may be implemented to get the needed battery parameters while running normal customer firmware. The data reporting systems and methods may also be implemented to record a battery charge/discharge "profile" while running normal firmware.

In a third example, a system under test unexpectedly has fans running at higher than normal speeds. The data reporting systems and methods may be implemented to gather diagnostic information about fan speeds and temperature measurements within the enclosure.

In a fourth example, a battery pack initially shows an amber LED (indicating a fault), yet later the battery appears to be functional. The data reporting systems and methods may be implemented to capture the presumed fault from the controller before the battery pack is removed.

These, in addition to numerous other exemplary uses are contemplated for the data reporting systems and methods.

In addition to the specific embodiments explicitly set forth herein, other aspects will be apparent to those skilled in the art from consideration of the specification disclosed herein. It is intended that the specification and illustrated embodiments be considered as examples only, with a true scope and spirit of the following claims.

The invention claimed is:

1. An electronics device comprising:
a processor configured to:
receive information from at least one subsystem in the electronics device, where the information includes status and/or diagnostic information for the at least one subsystem, and
encode an auxiliary signal representing the information, where the auxiliary signal conforms to an output protocol for optical output; and
an optical output device having a primary function to indicate a state of the electronics device and able to also concurrently output the auxiliary signal externally of the electronics device without disrupting the primary function, the optical output device outputting the auxiliary signal at varying duty cycles for individual bits in a bit stream encoding the auxiliary signal, the duty cycle based on a state of the optical output device just prior to outputting the auxiliary signal.

2. The electronics device of claim 1, wherein the auxiliary signal is overlaid on a primary signal indicating the state of the electronics device.

3. The electronics device of claim 1, wherein the processor is configured to alternate the duty cycle for outputting the auxiliary signal based on the state of the optical output device, the duty cycle selected so that a state of the output device indicated by a primary signal just prior to output of the auxiliary signal remains unchanged when the auxiliary signal is being output, wherein the duty cycle is high if the state of the output device is on, and the duty cycle is low if the state of the output device is off.

4. The electronics device of claim 1 in combination with a receiving device having:
an optical sensor configured to receive the auxiliary signal from the output device;
a processing device configured to decode the auxiliary signal; and
a high-pass filter to remove noise from light effects.

5. The electronics device of claim 1 in combination with a receiving device having at least one of:
a user interface configured to output the information from one or more subsystem in the electronics device after decoding by the receiving device; and
a storage device configured to store the information from one or more subsystem in the electronics device after decoding by the receiving device.

6. The electronics device of claim 1, wherein the auxiliary signal is transmitted regardless of the presence of a receiving device, but when the auxiliary signal is received at the receiving device the auxiliary signal is decoded with the receiving device so that a user of the receiving device is provided with the status and/or diagnostic information for the at least one subsystem.

7. The electronics device of claim 1, wherein the output device is selected from: at least one light-emitting diode (LED) indicator, and at least one non-visible LED indicator.

8. The electronics device of claim 1 further comprising a protocol to reduce human-visible flicker of the optical output device.

9. The electronics device of claim 8 wherein the protocol comprises sending each byte of a multi-bit packet asynchronously.

10. The electronics device of claim 9 wherein the protocol comprises two sync bits at the beginning of each byte.

11. The electronics device of claim 10 wherein including sync bits before each byte keeps delays in sending bytes from breaking the protocol.

12. The electronics device of claim 9 wherein the protocol returns the optical output device to a normal state for a predetermined minimum time between transmitting each byte to reduce change in brightness in the optical output device.

13. The electronics device of claim 12 wherein the predetermined minimum time is selected to reduce flicker of the optical output device to zero.

14. The electronics device of claim 1 wherein the a receiving device for the auxiliary signal is only sensitive to low-to-high transitions of the optical output device, and is unaffected by how long the optical output device stays on for each bit of the auxiliary signal.

15. A universal receiving device for use with the electronics device of claim 1 for data reporting, the universal receiving device comprising:
an optical sensor configured to receive an optical signal from an output device in the electronics device;
a high-pass filter to remove noise from the optical signal; and
a processing device operatively associated with the optical sensor to decode the optical signal into a bit stream representing status and/or diagnostic information about the electronics device, wherein the processing device is configured to synchronize an asynchronous bit stream from the output device.

16. The receiving device of claim 15, wherein the optical sensor is configured to receive the optical signal at varying duty cycles for individual bits in the bit stream based on a state of the output device just prior to outputting the optical signal at the output device.

17. The receiving device of claim 15, wherein the processing device synchronizes the bit stream using two sync bits in the bit stream.

18. The receiving device of claim 15, wherein the optical sensor is a light sensor configured to receive light signals from the output device configured as a light-emitting device.

19. A system for use in data reporting by an electronics device, comprising:

means for encoding a bit stream representing information from one or more subsystem in the electronics device as an optical signal;

means for outputting the bit stream as an optical signal, the means for outputting being provided in the electronics device for a local purpose in addition to outputting the bit stream externally to the electronics device, wherein the bit stream is transmitted via an output protocol which includes fluctuations in optical emission that nevertheless permit the means for outputting the bit stream to continue operating for the local purpose while transmitting the bit stream externally of the electronics device;

means for alternating a duty cycle for outputting the bit stream based on a state of the means for outputting the bit stream being on or off, wherein the duty cycle is based on a state of the means for outputting the bit stream just prior to outputting the bit stream;

means for receiving the bit Stream from the output device; and means for decoding the bit stream.

* * * * *

UNITED STATES PATENT AND TRADEMARK OFFICE
CERTIFICATE OF CORRECTION

| | |
|---|---|
| PATENT NO. | : 8,184,982 B2 |
| APPLICATION NO. | : 12/340700 |
| DATED | : May 22, 2012 |
| INVENTOR(S) | : Peter Lloyd McCollum |

It is certified that error appears in the above-identified patent and that said Letters Patent is hereby corrected as shown below:

In column 8, line 37, in Claim 14, delete "the a" and insert -- the --, therefor.

In column 10, line 6, in Claim 19, delete "Stream" and insert -- stream --, therefor.

Signed and Sealed this
Eighteenth Day of December, 2012

David J. Kappos
*Director of the United States Patent and Trademark Office*